March 3, 1936. J. McHENRY 2,032,946

FEEDING DEVICE FOR EGG TESTING AND GRADING MACHINES

Original Filed June 28, 1934

INVENTOR.
JAMES McHENRY
BY Edward M. Apple
ATTORNEY.

Patented Mar. 3, 1936

2,032,946

UNITED STATES PATENT OFFICE 2,032,946

FEEDING DEVICE FOR EGG TESTING AND GRADING MACHINES

James McHenry, Detroit, Mich., assignor of one-half to The Eastern Market Cold Storage Company, Detroit, Mich., a corporation of Michigan Original application June 28, 1934, Serial No. 732,803, now Patent No. 2,020,511. Divided and this application July 20, 1935, Serial No. 32,394

5 Claims. (Cl. 198—33)

This invention is a division of my copending application Serial Number 732,803, filed June 28, 1934, patented Nov. 12, 1935, No. 2,020,511, and relates to machines for testing and grading eggs and particularly to that type of machine wherein the eggs are moved over a source of light by means of an endless conveyor and graded as to size by determination of weight.

An object of the invention is the provision of a machine designed to automatically remove the eggs from containers, flats or cartons and feed them to the testing or grading units with a maximum of speed and a minium of breakage and checking.

Another object of the invention is the provision of an egg testing machine which will have greater efficiency and be more economical to operate than devices of this character heretofore known.

Another object of the invention is the provision of a device which is capable of simultaneously handling a plurality of eggs with increased efficiency and a minimum of loss due to breakage and checking.

The foregoing objects and other advantages of the invention will become more apparent as the description proceeds, reference being made from time to time to the drawing forming part of the disclosure, in which drawing.

Figure 1:
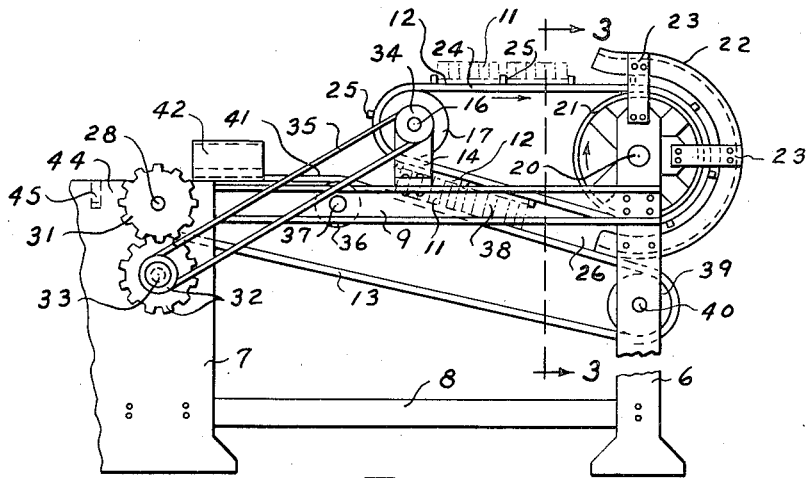
Fig. 1 is a side elevation of a machine embodying my invention.

Referring now, with more particularity, to the drawing, it will be seen that the working elements of the machine are carried and supported by a suitable structural frame consisting of pairs of upright side members 6 and 7 and longtudinal brace members 8, which are preferably secured to the aforementioned upright side members by rivets or other suitable means. The pairs of upright side members 6 and 7 are further connected to each other by means of longitudinally extending channel irons 9 and 10 which complete the frame for the loading mechanism which is designed to remove the eggs from cartons 11 (Fig. 1), and feed them to the candling and weighing units, such as disclosed in my said copending application.

Egg cartons normally have deep nests in which the eggs are carried and the nests rest upon a heavy base member 12 which cannot easily be removed from under a carton, therefore, a complete turnover has to be effected in order to quickly remove the eggs from the cartons and place them on the conveying belt 13, as is illustrated in Fig. 1. This is accomplished in the following manner: On top of the horizontal channel members 9 and 10, are mounted brackets 14 and 15 (Fig. 2), which provide the bearings for a drive shaft 16 upon which is fixedly placed a suitable roller 17. Near the top of the upright side members 6, bearings 18 and 19 are provided to receive the shaft 20, upon which is also fixedly mounted a pulley 21, which is of sufficient diameter to allow an egg carton to travel along its outside periphery without bending the carton. Surrounding the pulley 21 is a curved guard member 22, having inturned edges, which forms an inverted U-shaped channel through which the cartons pass. The guard 22 is held in place by brackets 23, which are secured to members 6, by any suitable means. A conveyor belt 24 extends tightly over the roller 17 and pulley 21 and travels in the direction indicated by an arrow. The outside periphery of said belt is divided into equal spaces by strips of rubber 25, which are securely fastened thereto, by any suitable means, leaving sufficient space between the strips to receive a carton of eggs, as illustrated in Fig. 1. The strips 25 provide a positive drive for the cartons and no slippage along the path of travel is possible. The cartons, after making a 180 degree turn, will emerge from the guard 22, at point 26, with the base 12 resting on top and thus will pass on to a secondary conveyor belt 13, (Fig. 1) which travels at the same relative speed as the conveyor belt 24. Belt 13 is driven by a roller 27, which is fixed to a drive shaft 28, which has its bearings in the upper end of members 7. The shaft 28 communicates with a drive shaft 29, through suitable gears contained in gear box 30, from which it receives its motive power, said drive shaft being connected to a self-contained motor and reduction gear (not shown), mounted upon the framework of the egg candling and grading mechanism, as disclosed in my co-pending application mentioned above. To the opposite end of shaft 28 is keyed a gear 31 which meshes with a combination gear and pulley 32, which in turn rotates upon an idler stud 33, which is securely fastened to member 7. A second pulley 34 is disposed in line with pulley 32 and is keyed to the end of the shaft 16. A drive belt 35 travels over the last named pulleys and supplies the operating power for the egg feeding unit. An idling roller 36, fastened to the shaft 37, which is journaled in members 9 and 10, is suitably located so as to produce a break in the direction of travel of the conveyor belt 13, and assures a parallel passage, as indicated at 38, between the upper and lower conveyor belts 24 and 13. Roller 39 moves freely upon shaft 40 which extends between the upright frame members 6 and aids to support the conveyor belt 13. All of the aforementioned members so arranged will co-operate to transport the complete carton of eggs to the horizontal table-like portion 41 of the conveyor belt 13, where the carton 11 and the base 12 may easily be removed, leaving the eggs free to travel under the dividing bridge 42 toward the candling unit. The member 42 consists of a strip of sheet metal which is formed with off-sets at each end to elevate it from the portion 41 of the conveyor 13 and is securely riveted to the frame members 9 and 10 respectively. Secured to the underside of bridge 42 is a plurality of wedge-shaped rubber partitions 43, adapted to direct the individual eggs into the proper channels for candling and inspection.

Figure 2:
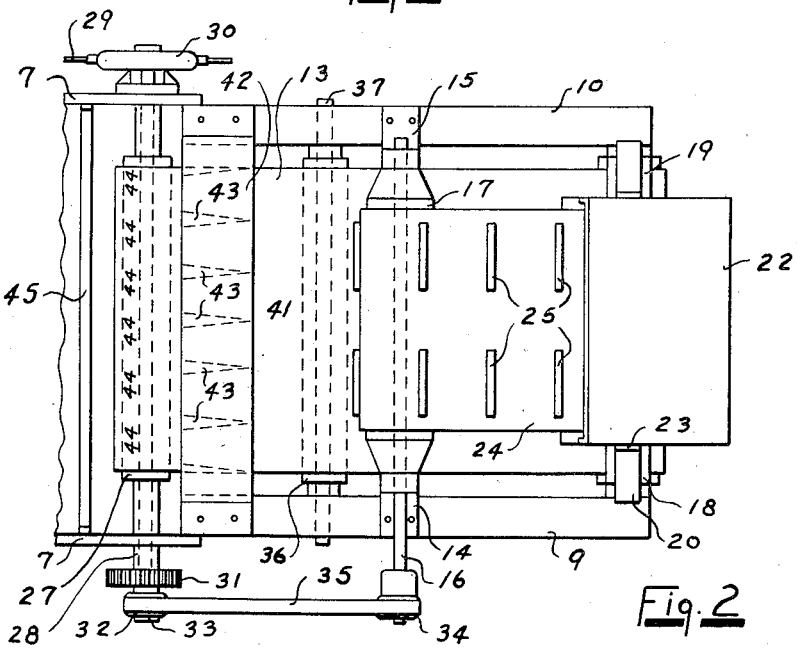
Fig. 2 is a plan view of the machine shown in Fig. 1.
Figure 3:
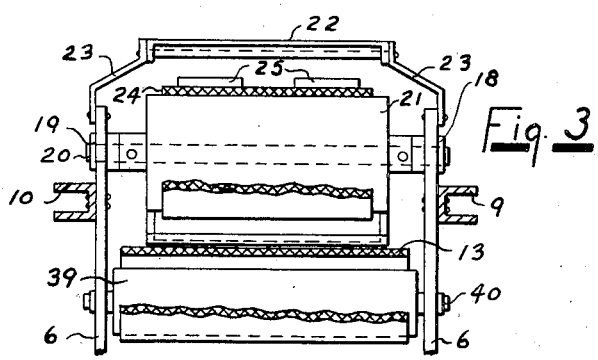
Fig. 3 is an enlarged vertical sectional view taken on line 3—3 of Fig. 1.

In order to retard the momentum of the falling eggs, when passing from the portion 41, of the conveyor belt 13, at point 44, a shock-absorbing rubber band 45 is stretched between the members 7—7 (Fig. 2).

Having described my invention, what I claim and desire to secure by Letters Patent is:

1. An in-feeding unit for an egg candling and grading mechanism comprising in combination a supporting frame, an endless conveyor mounted for movement on said frame, the incoming portion of said conveyor being arranged to travel, partly in a substantially horizontal plane and partly in an inclined plane, a second endless conveyor mounted for reverse movement on said frame above said first conveyor, the outgoing portion of said second conveyor being arranged to travel in a substantially horizontal plane and the return portion of said second conveyor being arranged to travel in an inclined plane adjacent the inclined portion of said first conveyor, a plurality of equally spaced transverse cleats secured to the outside periphery of said second conveyor, an arcuate housing enclosing one end of said second conveyor, and means for driving said conveyors simultaneously.

2. An in-feeding unit for an egg candling and grading mechanism comprising in combination a supporting frame, a pair of rollers journaled in said frame, one of said rollers being positioned in a lower plane than the other, an endless conveyor arranged to travel in a predetermined direction about said rollers, an idling roller positioned between said first mentioned rollers and arranged to cause part of the return portion of said conveyor to travel in a horizontal plane, a second pair of rollers arranged above said first pair of rollers, one of said second pair of rollers being comparatively larger than the other, a second endless conveyor arranged to travel in a reverse direction about said second pair of rollers and arranged so that its return portion travels in an inclined plane adjacent the inclined portion of said first conveyor, a plurality of equally spaced transverse cleats secured to the outside periphery of said second conveyor, a housing surrounding a portion of said comparatively large roller, and means for driving said conveyors simultaneously.

3. An in-feeding unit for an egg candling and grading mechanism comprising in combination a supporting frame, a pair of rollers journaled in said frame, one of said rollers being positioned in a lower plane than the other, an endless conveyor arranged to travel in a predetermined direction about said rollers, an idling roller positioned between said first mentioned rollers and arranged to cause part of the return portion of said conveyor, to travel in a horizontal plane, a second pair of rollers arranged above said first pair of rollers, one of said second pair of rollers being comparatively larger than the other, a second endless conveyor arranged to travel in a reverse direction about said second pair of rollers and arranged so that its return portion travels in an inclined plane adjacent the inclined portion of said first conveyor, a plurality of equally spaces transverse cleats secured to the outside periphery of said second conveyor, a housing surrounding a portion of said comparatively large roller, a bridge positioned transversely across the horizontal portion of said first conveyor, said bridge having a multiplicity of separators depending from its under side, and means for driving said conveyors simultaneously.

4. An in-feeding unit for an egg candling and grading mechanism comprising in combination a supporting frame, a pair of rollers journaled in said frame, one of said rollers being positioned in a lower plane than the other, an endless conveyor arranged to travel in a predetermined direction about said rollers, an idling roller positioned between said first mentioned rollers and arranged to cause part of the return portion of said conveyor to travel in a horizontal plane, a second pair of rollers arranged above said first pair of rollers, one of said second pair of rollers being comparatively larger than the other, a second endless conveyor arranged to travel in a reverse direction about said second pair of rollers and arranged so that its return portion travels in an inclined plane adjacent the inclined portion of said first conveyor, a plurality of equally spaced transverse cleats secured to the outside periphery of said second conveyor, a housing surrounding a portion of said comparatively large roller, a bridge positioned transversely across the horizontal portion of said first conveyor, said bridge having a multiplicity of separators depending from its underside, a shock absorber, comprising a strip of sheet rubber extending transversely of said frame adjacent the discharge end of said first conveyor, and means for driving said conveyors simultaneously.

5. An in-feeding unit for an egg candling and grading mechanism comprising in combination a supporting frame, a pair of rollers journaled in said frame, one of said rollers being positioned in a lower plane than the other, a sprocket fixed to one of said rollers, an endless conveyor arranged to travel in a predetermined direction about said rollers, an idling roller positioned between said first mentioned rollers and arranged to cause part of the said conveyor to travel in a horizontal plane, a second pair of rollers arranged above said first pair of rollers, a second endless conveyor arranged to travel about said second pair of rollers in a reverse direction to said first conveyor, a pulley on one of the rollers of said second pair, a combination idler sprocket and pulley journaled to said frame, said idler sprocket meshing with said first named sprocket, said pulley being connected by a belt to the pulley on the roller of said second pair, and means for driving said first named sprocket.

JAMES McHENRY.